A. McLAREN.
MACHINE FOR MOLDING AND BAKING PASTRY CUPS AND METHOD OF EXTRACTING THE PRODUCT FROM THE MOLDS.
APPLICATION FILED JAN. 2, 1917.
1,243,318.
Patented Oct. 16, 1917.
5 SHEETS—SHEET 1.
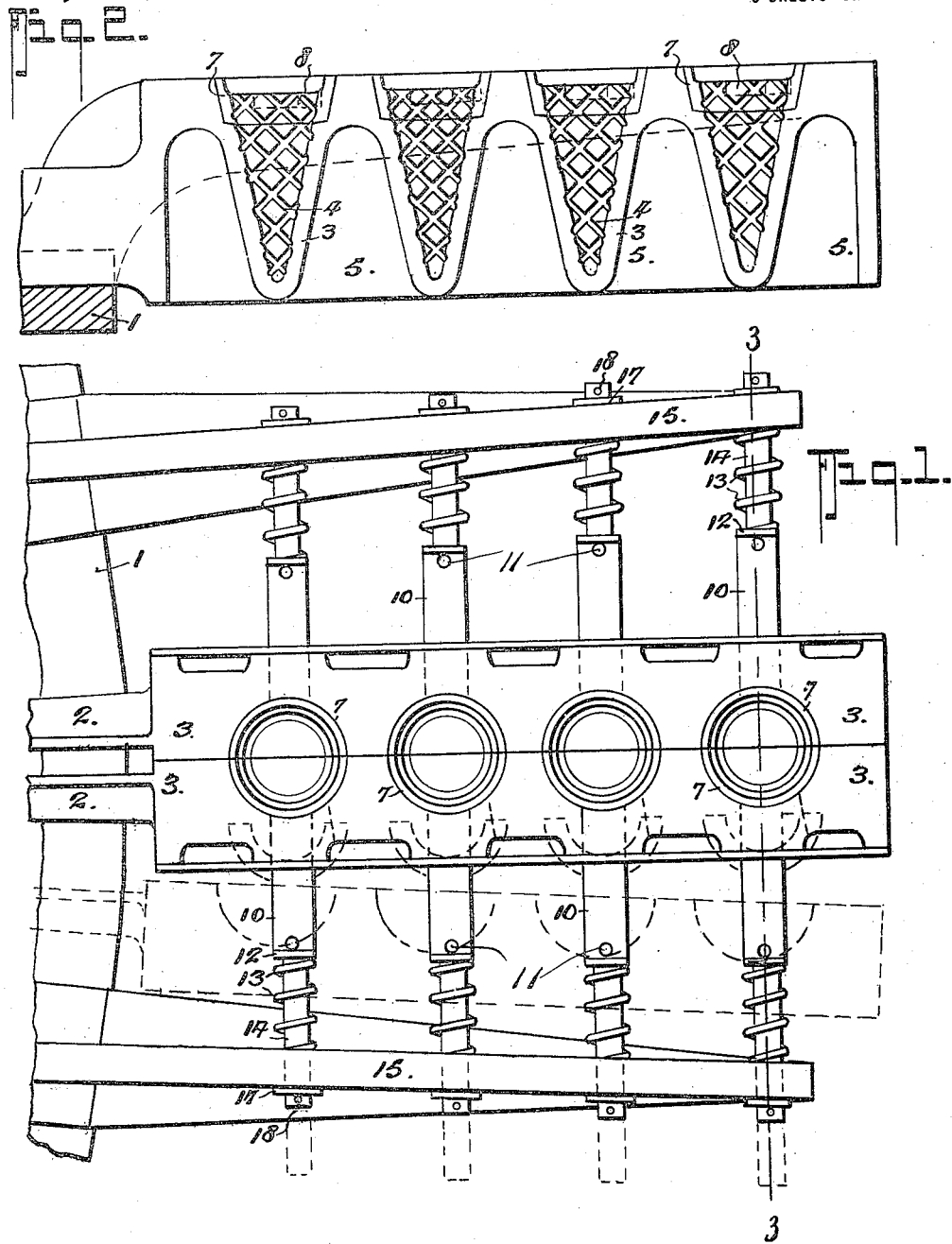
INVENTOR
Alexander McLaren
BY
Fred G. Dieterich & Co
ATTORNEYS.

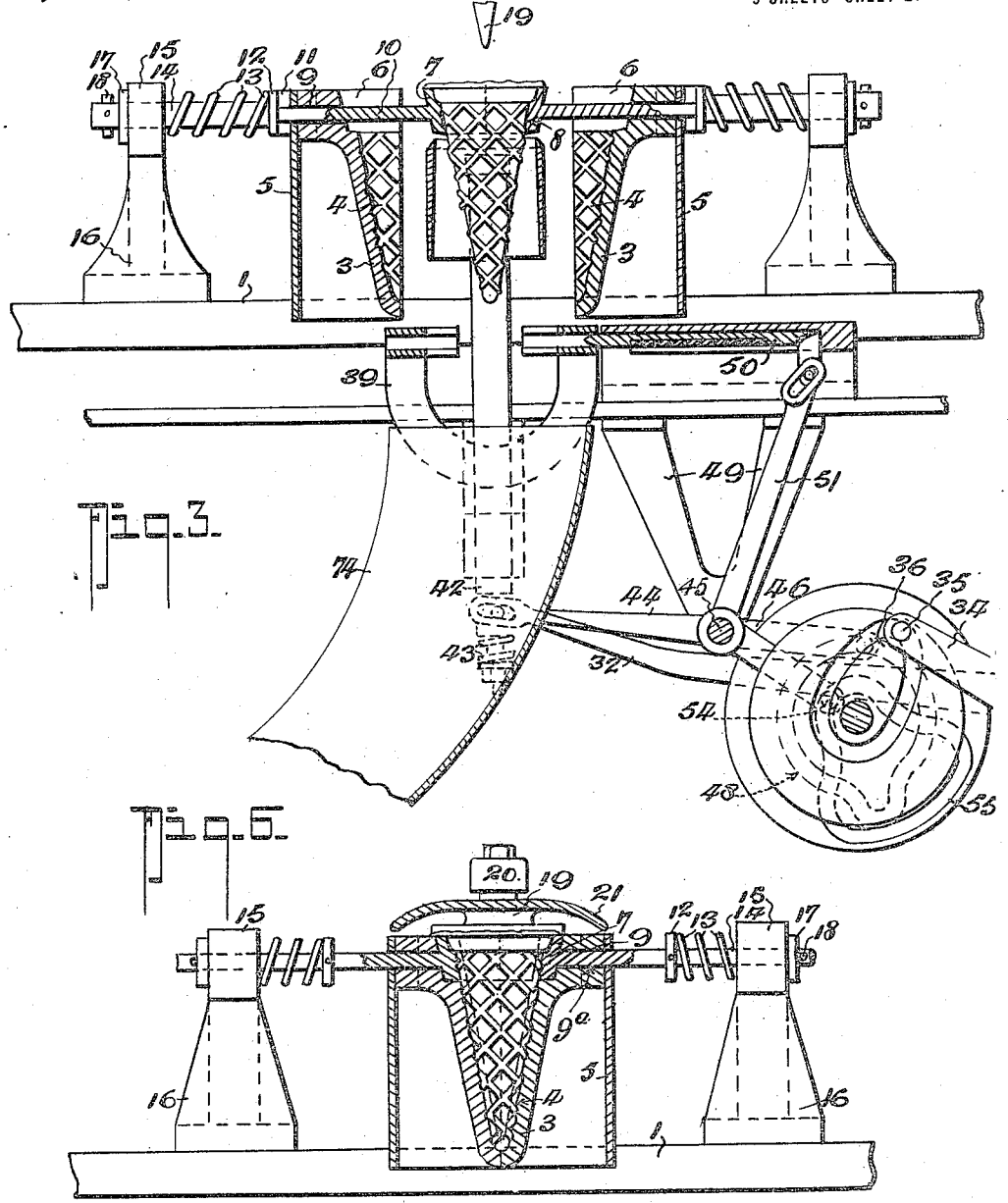

A. McLAREN.
MACHINE FOR MOLDING AND BAKING PASTRY CUPS AND METHOD OF EXTRACTING THE PRODUCT FROM THE MOLDS.
APPLICATION FILED JAN. 2, 1917.

1,243,318.

Patented Oct. 16, 1917.
5 SHEETS—SHEET 3.

INVENTOR
Alexander McLaren
BY
Fred G. Dieterich
ATTORNEYS.

A. McLAREN.
MACHINE FOR MOLDING AND BAKING PASTRY CUPS AND METHOD OF EXTRACTING THE PRODUCT FROM THE MOLDS.
APPLICATION FILED JAN. 2, 1917.

1,243,318.

Patented Oct. 16, 1917.

INVENTOR
Alexander McLaren
BY
Fred G. Dieterich & Co.
ATTORNEYS.

A. McLAREN.
MACHINE FOR MOLDING AND BAKING PASTRY CUPS AND METHOD OF EXTRACTING THE PRODUCT FROM THE MOLDS.
APPLICATION FILED JAN. 2, 1917.
1,243,318.
Patented Oct. 16, 1917.
5 SHEETS—SHEET 5.
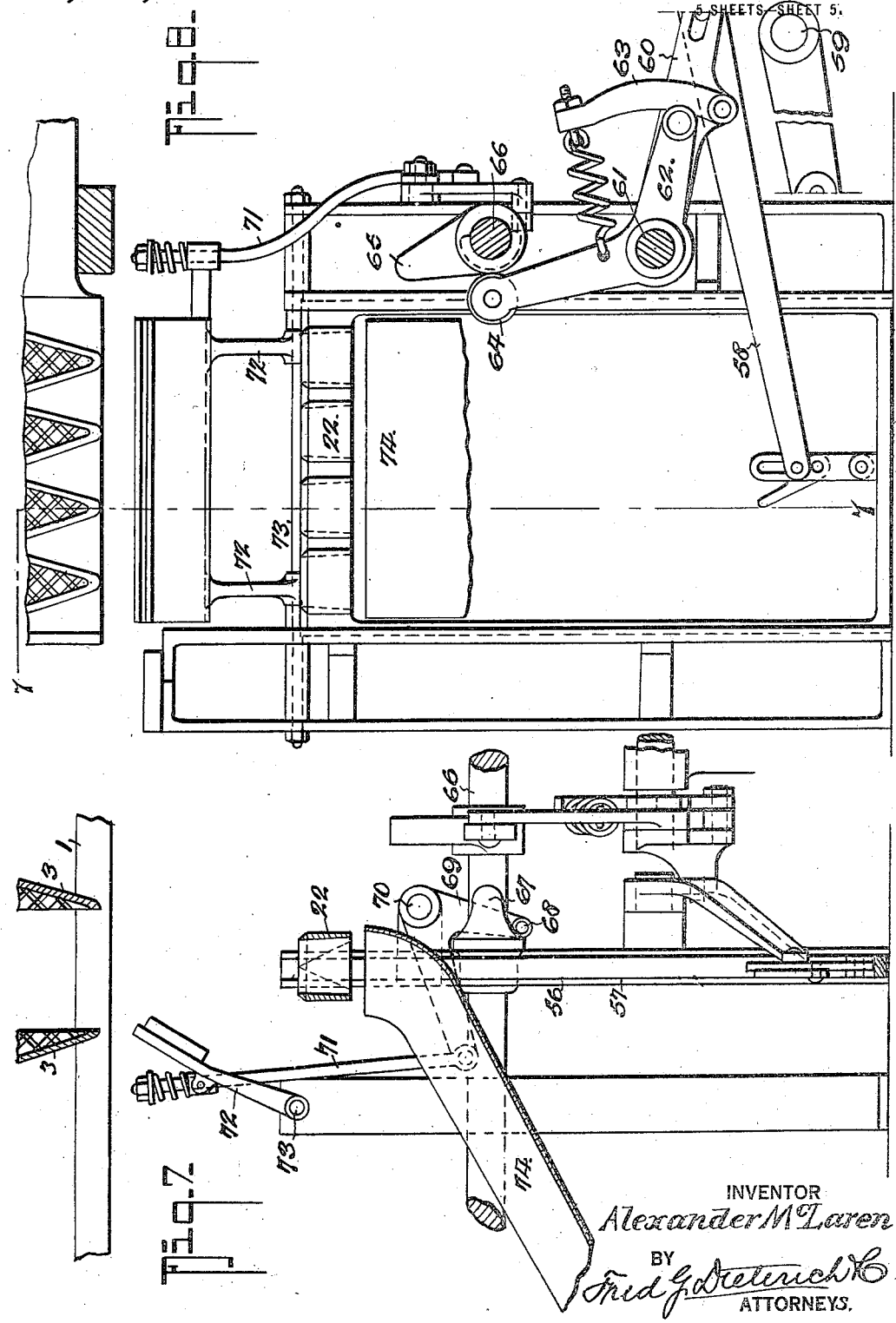
INVENTOR
Alexander McLaren
BY
Fred G. Dieterich & Co.
ATTORNEYS.

UNITED STATES PATENT OFFICE.

ALEXANDER McLAREN, OF CHICAGO, ILLINOIS.

MACHINE FOR MOLDING AND BAKING PASTRY CUPS AND METHOD OF EXTRACTING THE PRODUCT FROM THE MOLDS.

1,243,318.

Specification of Letters Patent.

Patented Oct. 16, 1917.

Application filed January 2, 1917. Serial No. 140,134.

*To all whom it may concern:*

Be it known that I, ALEXANDER McLAREN, residing at Chicago, in the county of Cook and State of Illinois, have invented certain new and useful Improvements in Machines for Molding and Baking Pastry Cups and Methods of Extracting the Products from the Molds, of which the following is a specification.

My invention relates especially to the class of molding and baking machines which are primarily designed for manufacturing cup pastry and more particularly ice cream cones. Machines of the class referred to may be divided into two distinct types namely,—1st:—that type in which the batter is baked in flat disks or waffle form and subsequently rolled upon a conical mandrel or former to produce what is known in the trade as a rolled or waffle cone, and secondly:—that type in which the batter is molded around a conical core in coniform molds and baked in the molds to provide what is styled a molded cone. It is to the latter type that my invention has relation.

The molded cone machines may be subdivided into three generic classes, the purely hand operated machines, *i. e.* those in which the various functions are performed by manual acts; the semi-automatic machines, *i. e.*, those in which some of the functions are automatic while others require manual assistance; and thirdly, the purely automatic, *i. e.*, those in which the intervention of manual actions are not normally required from the time the batter is placed in the receiver until the finished product leaves the machine.

While my invention has been especially designed for use in the purely automatic types of machines it may be, nevertheless, employed in the semi-automatic types or even in some of the manually operated machines, so I do not desire to be understood as limiting myself when I hereinafter describe the invention as applied to automatic machines.

Of the automatic machines with which my invention is particularly designed to be used, I may mention those known as the Bruckman machines (see Patent #1,071,027, issued August 26, 1913; #1,075,625, issued October 14, 1913;) the Groset machines, (see Patent #1,122,913, issued December 29, 1914) and in fact almost any automatic or semi-automatic machine or manual machine which employs separable female mold parts and cores to coöperate with the same to mold the cones. In machines of the Bruckman type (this type also including the Groset machines) the cones are extracted from the molds by, what practice has demonstrated, a very practicable and ingenious method namely, that of first raising the cores to loosen the cores from the cones before the female molds are parted and then opening the female mold sections while the core still projects into the cone, thus the core is first stripped loose from the cone and is then used as a finger to strip the cone loose from the female sections should the cone adhere thereto as the molds open. My invention has especial relation to a method and apparatus for extracting the cones from the molds in such a way that the cores may be wholly withdrawn from the molds before or during the opening act of the female molds, while the cones are held temporarily from movement to strip them from the opening parts of the female molds and then released into a receiver that lowers the cones out from between the female molds, the receiver may or may not be a part of the trimming mechanism.

Generically, then my invention resides first in providing mechanism for holding the baked cones in a relatively stationary position after the cores are loosened (and removed, if desired) and during the initial part of the opening movement of the female mold sections, and secondly, in providing a device which is projected between the partly separated female mold sections to receive or embrace the cones and hold them against following the female mold sections as they continue separation to release the cones from the molds and the holding device, and thirdly, the method of extracting the cones from the molds, which consists in holding the cones against movement during the initial part of the opening act of the female molds to strip the cones loose from the moving parts of the female molds and subsequently holding the cones while the prior holding device is separated from the cones and then removing the cones from their location between the female mold parts.

More specifically the invention resides in providing the female mold sections with separable parts, certain of which open up in advance of the others, the latter serving to hold the cones stationary while the former separate from the cones during the initial opening movement of the molds, but which latter devices separate or leave the cones as soon as the receiver has been projected between the initially separated parts of the female molds to embrace the cones and restrain them from following the mold parts when completing the opening and releasing act.

The invention also resides in those novel details of construction, combination and arrangement of parts, all of which will be first fully described, then be specifically pointed out in the appended claims, reference being had to the accompanying drawings in which:—

Figure 1 is a top plan view of the invention adapted for use on molds of the Bruckman specific type, i. e., those which open up "scissors fashion."

Fig. 2 is an elevation of a female mold half embodying the cone holding members.

Fig. 3 is a vertical section on the line 3—3 of Fig. 1, also showing a coöperating trimming mechanism, the trimmer tube of which serves as the cone receiver and is shown elevated between the partly open female mold sections to receive the cones.

Fig. 6 is a view similar to Fig. 3 showing the female molds and core in the molding and baking position (closed) the construction being shown for use on molds in which the female sections open and close with parallel motion, thus making the distance through which the molds can move to open and close less than in the type in which the opening and closing act is accomplished "scissors fashion."

Fig. 7 is a vertical section on the line 7—7 of Fig. 8, showing a different form of trimming mechanism for use in connection with my invention.

Fig. 8 is a vertical elevation and part section of the same.

Figure 4:
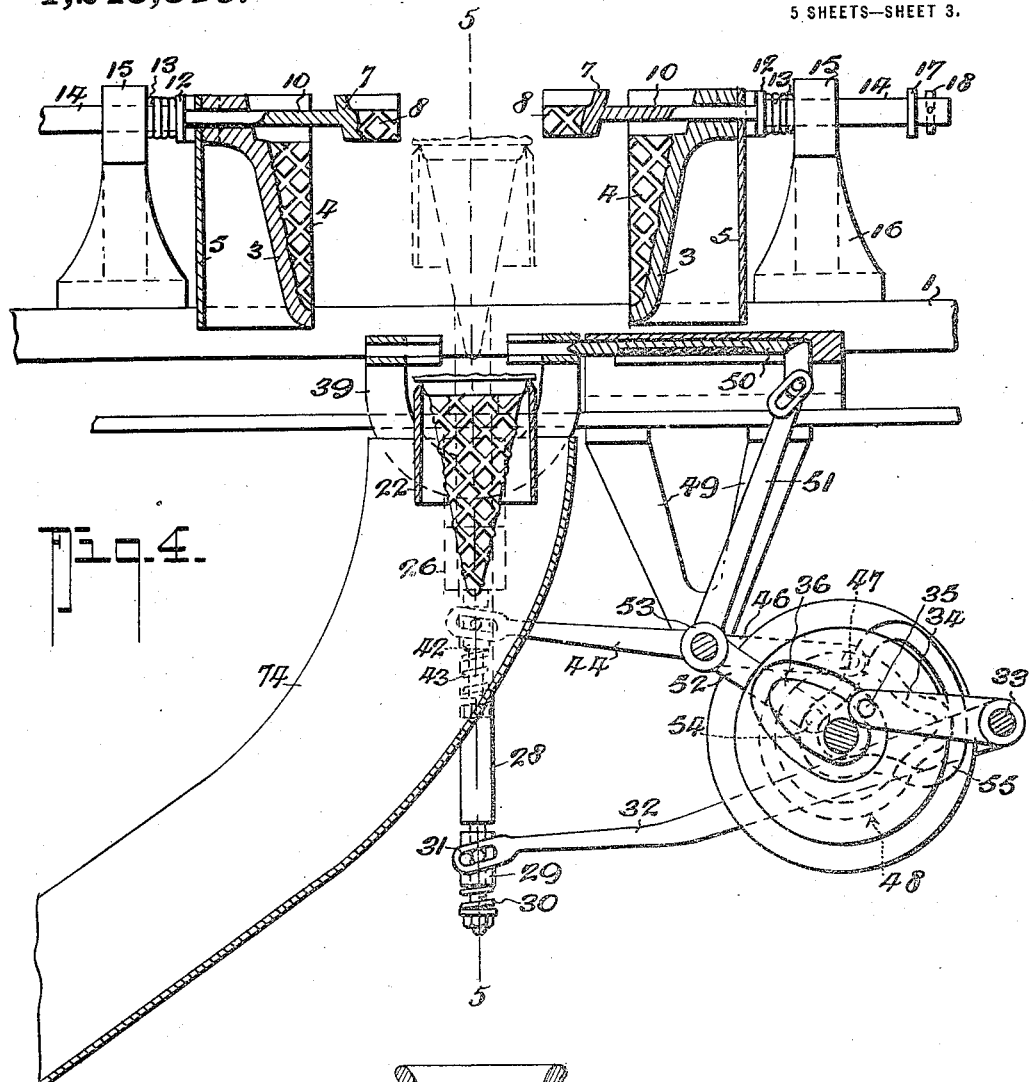
Fig. 4 is a view similar to Fig. 3 showing the cone released into the trimmer tube (the receiver) in dotted lines, and showing the same lowered to the trimmer place in full lines, the molds being fully open.

Referring now to the accompanying drawings which illustrate a practical embodiment of my invention, 1 indicates the rim of the rotary wheel on which the molding devices are mounted (as applied to the rotary type of machines). The molding devices comprise mold carriers 2 on which the female mold halves 3 are sustained. The female mold halves 3 are mating halves and contain the mold cavities 4 and support the side oven plates 5 which retain the burners (not shown). In applying my invention I make each female mold section of a plurality of parts, one of which comprises what I shall hereinafter term the cone holder and consists of the member 7 set into a countersunk portion 6 of the mold so that when the member 7 has receded into the countersunk portion 7 the inner surface 8 of the member 7 will coincide with the cone forming surface of the mold (see Fig. 6). The member 7 is supported on a bar 10 which slides in a slot 9 in the mold section and may be provided with a pin 11 which has rolling contact with the side of the mold during the opening act. The opposing holder members 7 are continuously tending to assume the closed position under the influence of springs 13 which are located between collars 12 and bearings 15 on the extension 14 of the bar 10, the bearings 15 being mounted at 16 onto the wheel rim 1. The movement of the holder members under the influence of the springs 13 is restrained by collars 17 and pins 18.

20 designates the core bar on which the cores 19 are mounted; the cores 19 having the oven hoods 21, as shown.

Figure 10:
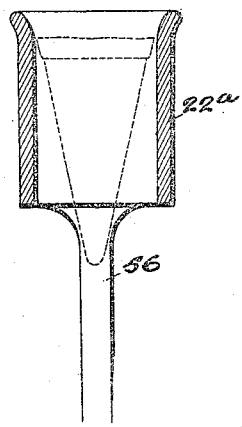
Fig. 10 is a detail section of a modification of the cone receiver constructed to permit the cones to drop directly through the same.

22 designates the tubes which are designed to be projected up between the partly separated female mold members, as indicated in Fig. 3 to receive the cone as the members 7 are separated during the final separation movement of the molds, as will hereinafter more clearly appear, and the tubes 22 may be the trimmer tubes when a trimming mechanism is employed in the invention, or they may be simply plane receiving tubes 22ª, as shown in Fig. 10, through which the cones drop by gravity as soon as they become detached from the holders 7.

Figure 5:
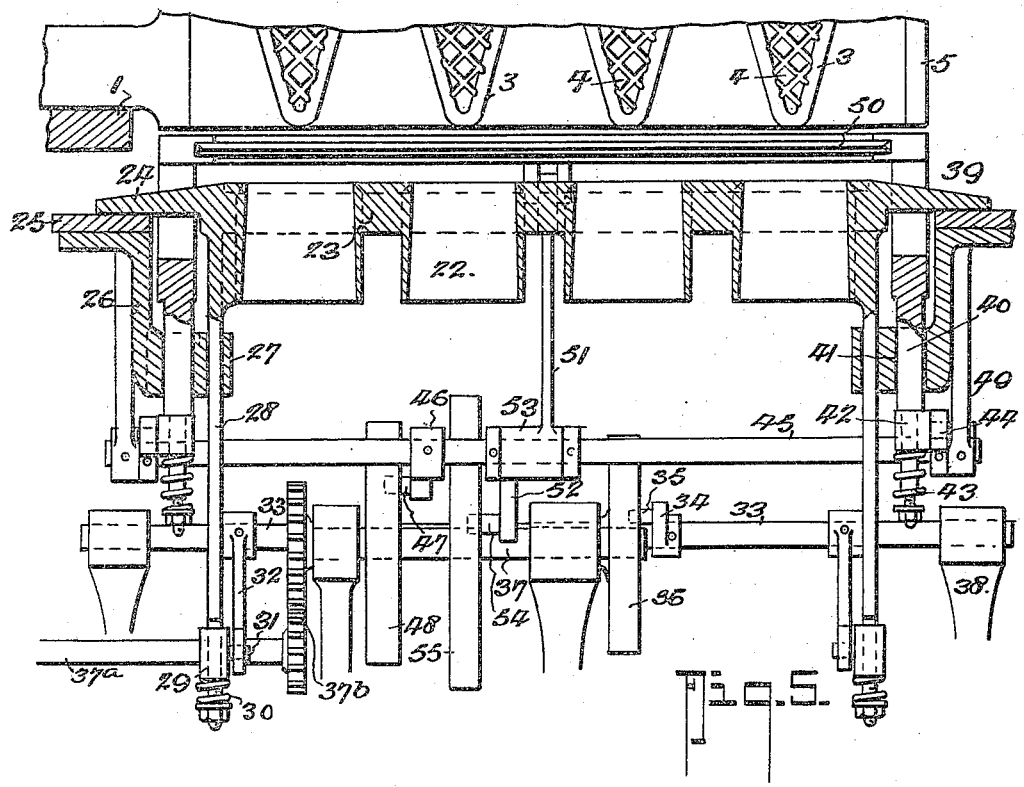
Fig. 5 is a vertical section on the line 5—5 of Fig. 4.

I prefer, however, to use a trimming mechanism in connection with the improved mold parts, as the trimmer tubes 22 can then be caused to perform the dual function of trimmer tubes and cone receivers and I do not wish to limit myself to the employment of any particular style of trimmer mechanism be it a reciprocating shuttle motion type, such as shown in Figs. 3 to 5, inclusive, or a pivoted pusher type, such as shown in Figs. 7 and 8, for instance.

When the trimming mechanism such as shown in Figs. 3 to 5, inclusive, is employed, it is preferably constructed as indicated in those figures, by reference to which it will be noted that the several trimmer tubes 22 are formed on a cross bar 23 whose ends 24 are designed to rest on the stationary rim bars 25 when the tubes are in the lowered position, and the bar 23 is carried by sliding bar 28 that have movement in the bearing portions 27 of the brackets 26 and carry collars 29 which engage buffer springs 30 and have pins 31 to enter the slotted ends of the levers 32, which levers are secured to a rock shaft 33 which is actuated by a lever 34 whose pin 35 enters the groove of a cam 36 on the shaft 37, the shaft 37 being either a first motion shaft, or receiving its power from another shaft 37ª through a gear connection 37ᵇ. The rock shaft 33 is mounted in suitable bearings 38.

39 is the reciprocating pusher frame whose rods 40 are mounted in the bearing portions 41 of the brackets 26 and the frame 39 is raised and lowered at proper intervals by a cam 48 operating through the pin connection 47 of the lever 46 to rock the shaft 45 on which the levers 44 are secured, the levers 44 having in turn a pin and slot connection with the slide blocks 42 on the rods 40 on which are also located the buffer springs 43.

50 is the pusher plate which has a shuttle motion to introduce it into the frame 39 and withdraw it from the frame 39 at proper intervals, the pusher plate 50 receiving its shuttle motion through the action of a bell crank lever 51 that is loose on the shaft 45 and has its free arm 52 provided with a pin 54 to coöperate with the cam 55 on the shaft 37.

Instead of using a trimming mechanism of the type just described, the mechanism shown in Figs. 7 and 8 may be employed and by reference to which it will be observed that the trimmer-tube-receiver 22 is mounted on a slide frame 56 that is vertically slidable in guides 57 under the action of a lever 58 that is fulcrumed at 59, the lever 58 being operated by a bell crank 62 on a stud 61 that has a yielding connection 63 with a lever 60 also fulcrumed on the stud 61 and pin and slot connected to the lever 58, the yieldable connection being designed to give in case the parts become jammed. The bell crank 62 has a roller 64 that is engaged by a cam 65 on the first motion shaft 66 on which there is also located a cam 67 that engages a roller 68 on another bell crank 69 that is fulcrumed at 70 and is connected by a rod 71 with the pusher 72. The pusher 72 is fulcrumed at 73.

74 indicates the chute onto which the cones are deposited after leaving the trimmer tubes.

Instead of employing the trimmer mechanism shown, the receiver may be a plain tubular member 22ª of greater diameter than the heads of the cones so that the cones when released from the holder will fall directly through the receiver 22ª (the receiver 22ª being located in lieu of the tube 22) and drop onto the chute 74 by which they may be shot out from the machine or shot into another trimmer mechanism such as is now employed in the Bruckman machines before referred to.

Figure 9:
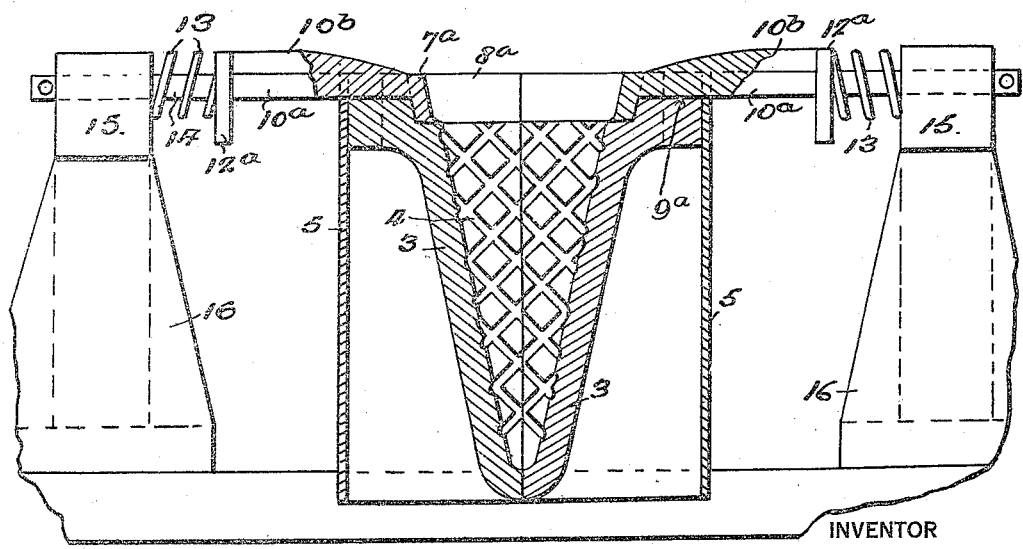
Fig. 9 is a cross section of a modified form of the female molds.

Instead of having the holder 7 mounted on arms 10 which operate in slots in the mold sections, the mold sections may be recessed at 9ª and the section 7ª may be mounted on the arms 10ª that operate in the recesses 9ª, the arms in this case being strengthened by webs 10ᵇ to prevent displacement and the pin 11 and disk 12 being replaced by a shoulder 12ª, if desired, (see Fig. 9 of the drawings). In this application also the holding surfaces 8ª of the holder 7 may be designed to mold only the upper or mouth end of the cone and not any of the lower portion, as in the form shown in Fig. 3.

It is obvious that the holder 8ª may be made to form more or less of the cones as conditions may make necessary in practice.

In operation, when the molds are closed, as shown in Fig. 6, with the molded product baked and ready for discharge, as the molding devices reach the extraction or discharge station the cores 19 will be withdrawn and the female molds will begin to open (see Fig. 3). As soon as the femals molds have opened to a degree sufficient to permit introduction of the tubes 22 they are inserted up to the position indicated in Fig. 3 by which time the female mold sections will then engage the pins 11 and further opening of the female mold parts will carry with them the holder rings 7 which thus become detached from the cones. Should the cones stick to one half ring or the other, as soon as the cone engages the holder 22, it will be detached from the ring to which it sticks and drop down into the holder, as shown in dotted lines in Fig. 4. As soon as this occurs, the holder is lowered to the position shown in Fig. 4, the shuttle plate 50 is reciprocated into the frame 39 and the frame 39 lowered down to push the cone through the trimmer tube and discharge it, after which the parts reassume the initial position to receive the cones from the next set of molds.

While I have shown two styles of trimming mechanism in this application, namely, the reciprocating type, and the pivoted type, yet I desire it understood that I make no claim *per se*, to the construction of trimming mechanisms, and while I have shown and described the invention as particularly adapted for use on the machines referred to yet I desire it understood that the invention may be employed wherever found useful and in its broad aspects is applicable to other types of machines.

From the foregoing description taken in connection with the accompanying drawings, it is thought the complete construction, operation and advantages of my invention will be readily understood by those skilled in the art.

What I claim is:

1. The method of extracting cones from molding devices which molding devices include cores and separable female mold members; said method consisting in elevating the cores to release them from the cones, holding the cones by exterior engagement against movement during the initial part of the opening movement of the female molds, and then opening the female molds fully and disengaging the cones.

2. The method of extracting cones from molding devices which molding devices include cores and separable female mold members; said method consisting in elevating the cores to release them from the cones, holding the cones by exterior engagement against movement during the initial part of the opening movement of the female molds, and then opening the female molds fully and disengaging the cones while restraining the cones against lateral mold-following movement during the remaining mold opening action.

3. The method of detaching the baked product from molding devices of the type having separable female mold sections and core therefor which consists in holding the product stationary by exterior engagements during the initial part of the female mold opening act and restraining the product against lateral mold-following movement during the remaining part of the mold opening act.

4. The method of detaching the baked product from molding devices of the type having separable female mold sections and core therefor, which consists in holding the product stationary by exterior engagement during the initial part of the female mold opening act, removing the cores, and restraining the product against lateral mold-following movement during the remaining part of the mold opening act.

5. In a mechanism of the class described, a pair of separable female mold members, a core therefor, a cone holder for holding the cones separated during the initial separation of the female mold members to release the cone from the separated parts, means to release the holder, and other means to restrain the cone against lateral movement as the holder is released to free the cone from the same.

6. In a machine of the character described, having a pair of separable female mold parts, a core therefor, and means for opening and closing the several mold members; a cone holder independent of the core for holding the cone stationary by external engagement during the initial part of the mold opening act.

7. In a machine of the character described, having a pair of separable female mold parts, a core therefor, and means for opening and closing the several mold members; a cone holder independent of the core for holding the cone stationary by external engagement during the initial part of the mold opening act, and means for releasing the cone from the holder.

8. In a machine of the character described, having a pair of separable female mold parts, a core therefor, and means for opening and closing the several mold members, a cone holder independent of the core for holding the cone stationary by external engagement during the initial part of the mold opening act, and means operable during the final part of the mold opening act for releasing the cone from the holder.

9. In a machine of the character described, having a pair of separable female mold parts, a core therefor, and means for opening and closing the several mold members; a cone holder independent of the core for holding the cone stationary by external engagement during the initial part of the mold opening act, and means operative by the female mold members during their final opening movement to release the cone from the holder.

10. In a machine of the character described, having a pair of separable female mold parts, a core therefor, and means for opening and closing the several mold members; a cone holder independent of the core for holding the cone stationary during the initial part of the mold opening act, a cone receiver, and means for projecting the receiver between the partly opened female mold members to embrace the cone before the holder is operated to release the cone.

11. In a machine of the character described, having a pair of separable female mold parts, a core therefor, and means for opening and closing the several mold members; a cone holder independent of the core for holding the cone stationary during the initial part of the mold opening act, means operable during the final part of the mold opening act for releasing the cone from the holder, a cone receiver, and means for projecting the receiver between the partly opened female mold members to embrace the cone before the holder is operated to release the cone.

12. In a machine of the character described, having a pair of separable female mold parts, a core therefor, and means for opening and closing the several mold members; a cone holder independent of the core for holding the cone stationary during the initial part of the mold opening act, means operative by the female mold members during their final opening movement to release the cone from the holder, a cone receiver, and means for projecting the receiver between the partly opened female mold members to embrace the cone before the holder is operated to release the cone.

13. In a machine of the character stated, having a pair of separable female mold parts, a core therefor, and means for opening and closing the several mold members; a cone holder independent of the core for holding the cone stationary during the initial part of the mold opening act, means for releasing the cone from the holder, a cone receiver, means for projecting the receiver between the partly opened female mold members to embrace the cone before the holder is operated to release the cone, and means for discharging the cone from the receiver.

14. In a machine of the character described, having a pair of separable female mold parts, a core therefor, and means for opening and closing the several mold members; a cone holder independent of the core for holding the cone stationary during the initial part of the mold opening act, means for releasing the cone from the holder, a cone receiver, means for projecting the receiver between the partly opened female mold members to embrace the cone before the holder is operated to release the cone, and means for discharging the cone from the receiver.

15. In a machine of the character described, having a pair of separable mold parts, a core therefor, and means for opening and closing the several mold members; a cone holder independent of the core for holding the cone stationary during the initial part of the mold opening act, means for releasing the cone from the holder, a cone receiver, means for projecting the receiver between the partly opened female mold members to embrace the cone before the holder is operated to release the cone, and means for discharging the cone from the receiver after the same has been lowered from between the female mold parts.

16. In a machine of the character described, having a pair of separable female mold parts, a core therefor, and means for opening and closing the several mold members; a cone holder independent of the core for holding the cone stationary during the initial part of the mold opening act, means operable during the final part of the mold opening act for releasing the cone from the holder, a cone receiver, means for projecting the receiver between the partly opened female mold members to embrace the cone before the holder is operated to release the cone, and means for discharging the cone from the receiver after the same has been lowered from between the female mold parts.

17. In a machine of the character described, having a pair of separable female mold parts, a core therefor, and means for opening and closing the several mold members; a cone holder independent of the core for holding the cone stationary during the initial part of the mold opening act, means operative by the female mold members during their final opening movement to release the cone from the holder, a cone receiver, means for projecting the receiver between the partly opened female mold members to embrace the cone before the holder is operated to release the cone, and means for discharging the cone from the receiver after the same has been lowered from between the female mold parts.

18. In a machine of the character described, having a pair of separable female mold parts, a core therefor, and means for opening and closing the several mold members; a cone holder independent of the core for holding the cone stationary during the initial part of the mold opening act, means for releasing the cone from the holder, a cone receiver, means for projecting the receiver between the partly opened female mold members to embrace the cone before the holder is operated to release the cone, said receiver comprising a trimmer tube and means for pushing the cone through the trimmer tube to trim the cone and discharge it from the tube.

19. In a machine of the character described, having a pair of separable female mold parts, a core therefor, and means for opening and closing the several mold members; a cone holder independent of the core for holding the cone stationary during the initial part of the mold opening act, means operable during the final part of the mold opening act for releasing the cone from the holder, a cone receiver, means for projecting the receiver between the partly opened female mold members to embrace the cone before the holder is operated to release the cone, said receiver comprising a trimmer tube and means for pushing the cone through the trimmer tube to trim the cone and discharge it from the tube.

20. In a machine of the character described, having a pair of separable female mold parts, a core therefor, and means for opening and closing the several mold members, a cone holder independent of the core for holding the cone stationary during the initial part of the mold opening act, means for releasing the cone from the holder, a cone receiver, means for projecting the receiver between the partly opened female mold members to engage the cone before the holder is operated to release the cone, said receiver comprising a reciprocating trimmer tube, and means for forcing the cone through the trimmer tube to trim the cone and discharge it from the tube.

21. In a machine of the class described, the combination with the separable female mold sections each of which comprises a plurality of complementary parts, means for opening and closing said sections, and means for retarding the opening movement of certain of said parts whereby the cone is stripped from the initially movable parts in advance of the opening of the finally movable parts.

22. In a machine of the class described, the combination with the separable female mold sections each of which comprises a plurality of complementary parts, means for opening and closing said sections, means for retarding the opening movement of certain of said parts whereby the cone is stripped from the initially movable parts in advance of the opening of the finally movable parts, and means for holding the cone against follow-up movement during the final opening movement of the female mold parts.

23. In a machine of the class described, the combination with the separable female mold sections each of which comprises a plurality of complementary parts, means for opening and closing said sections, and means for retarding the opening movement of certain of said parts whereby the cone is stripped from the initially movable parts in advance of the opening of the finally movable parts, in combination with a cone receiver and means for projecting the receiver between the initially separated mold members before the remaining parts are separated to loosen the cone from said remaining parts.

24. In a machine of the class described, the combination with the separable female mold sections each of which comprises a plurality of complementary parts, means for opening and closing said sections, and means for retarding the opening movement of certain of said parts whereby the cone is stripped from the initially movable parts in advance of the opening of the finally movable parts, in combination with a cone receiver and means for projecting the receiver between the initially separated mold members before the remaining parts are separated to loosen the cone from said remaining parts and means for discharging the cone through the receiver.

25. The method of extracting cones from molding devices which molding devices include a core and separable female mold members, said method consisting in elevating the core to release it from the cone, holding the cone against movement during the initial part of the opening movement of the female mold members by holding a portion of the cone and then opening the female mold members fully and disengaging the cone by releasing the portion of the cone which has been held.

26. The method of extracting cones from molding devices which molding devices include a core and separable female mold members; said method consisting in elevating the cores to release them from the cones, holding the cones against movement during the initial part of the opening movement of the female mold members by holding a portion of the cone and then opening the female molds fully and during the movement of the female molds to fully open them, release the portion of the cone that has been held and thereby disengage the cone.

27. In a machine of the character described, having a pair of separable female mold members, a core therefor, and means for opening and closing the several mold members, means for holding a portion of the cone during the initial part of the opening movement of the female mold members, and means operative during the movement of the female mold members to fully open them for releasing said cone holding means to thereby disengage the cones.

28. The method of extracting cones from molding devices, which devices include cores and separable female mold members; said method consisting in elevating the cores to loosen them from the cones, holding the cones by engagement of the exterior of the cones during the initial part of the opening movement of the female mold members, and then opening the female mold members further and releasing the external engagement to permit the disengagement of the cone and the discharge of the same from the molds.

ALEXANDER McLAREN.

Copies of this patent may be obtained for five cents each, by addressing the "Commissioner of Patents, Washington, D. C."